United States Patent [19]

Hishida

[11] 4,423,540
[45] Jan. 3, 1984

[54] METHOD OF MANUFACTURING A BEARING HOUSING

[76] Inventor: Tadashi Hishida, 2-3, 2-cho, Kitashimizu-cho, Sakai-shi, Osaka-fu, Japan

[21] Appl. No.: 327,738

[22] Filed: Dec. 4, 1981

[30] Foreign Application Priority Data

Dec. 15, 1980 [JP] Japan .................................. 55-180982

[51] Int. Cl.$^3$ .......................... B23P 3/00; B23P 19/04
[52] U.S. Cl. ........................................ 29/460; 29/525;
264/261; 264/277; 308/236; 403/267
[58] Field of Search .................. 29/149.5 R, 434, 525,
29/460; 308/440, 439, 438, 236, 207, 189 R;
403/269, 267, 265; 264/261, 262, 277

[56] References Cited

U.S. PATENT DOCUMENTS

| | | | |
|---|---|---|---|
| 1,515,266 | 11/1924 | Mitchell | 29/460 UX |
| 1,843,904 | 2/1932 | Smith et al. | 264/262 X |
| 3,167,364 | 1/1965 | Dunn | 308/189 |
| 3,214,504 | 10/1965 | Gemberling | 264/277 X |
| 3,532,402 | 10/1970 | Beery et al. | 308/236 |
| 4,150,468 | 4/1979 | Harbottle | 308/236 X |
| 4,243,628 | 1/1981 | Herold | 264/277 X |
| 4,244,630 | 1/1981 | Tischer | 308/189 R |

Primary Examiner—Charlie T. Moon
Attorney, Agent, or Firm—Wenderoth, Lind & Ponack

[57] ABSTRACT

A simple method of manufacturing a bearing housing coaxially accommodating two bearings is proposed. A male mold with a core and a female mold are used. A fluid synthetic resin is inserted into a space left between the male mold and the female mold to form a bearing housing. This method assures that two bearings are exactly coaxial with each other.

4 Claims, 3 Drawing Figures

METHOD OF MANUFACTURING A BEARING HOUSING

BACKGROUND OF THE INVENTION

The present invention relates to a method of manufacturing a bearing housing which coaxially accommodates two bearings.

It has been a common practice to mount a bearing housing on the frame of a machine or apparatus to support a rotary shaft, to the end of which a pulley or gear is secured to transmit its rotation to another shaft.

A bearing housing with two bearings instead of a single bearing provides more stability for the shaft and permits the transmission of a larger rotatory power.

In accommodating two bearings in the housing, it is essential to arrange them in such a manner that the axis of one bearing is exactly coaxial with that of the other bearing. Otherwise difficulty would be encountered in the insertion of the shaft into the two bearings and, when the shaft rotates, it would exert such a stress on the inner rings of the two bearings as to cause them to turn eccentrically.

Because this essential requirement must be met, much labor has been required in manufacturing a bearing housing of this type.

SUMMARY OF THE INVENTION

It is an object of the present invention to provide a simple method of manufacturing a bearing housing of the above-described type.

It is another object of the present invention to provide a method by which two bearings can be accurately aligned with each other.

With these objects in view and as will become apparent from the following detailed description, the present invention will be more clearly understood in connection with the accompanying drawings.

DETAILED DESCRIPTION OF THE INVENTION

Figure 1:
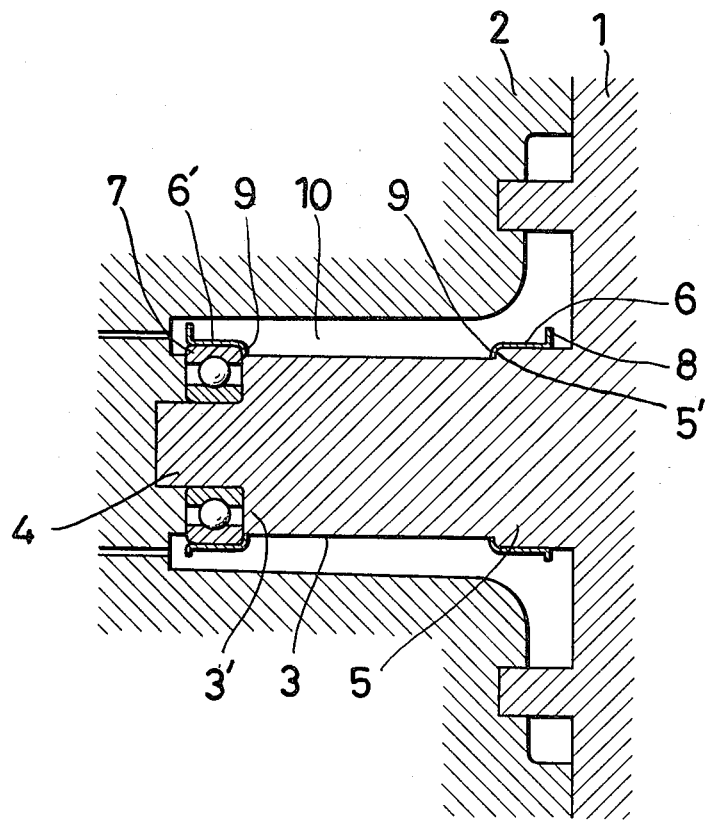
FIG. 1 is a cross-sectional view of metal molds used in carrying out the method according to the present invention.

Referring now to FIG. 1, metal molds used in manufacturing a bearing housing by the method of the present invention comprises a male mold 1 and a female mold 2. The male mold 1 includes a core 3 and a small-diameter portion 4 coaxially formed on the end of the core. The diameter of the portion 4 is made to be equal to the inside diameter of the inner rings of two bearings to be accommodated in the housing. Close to the base of the male mold 1, the core 3 has a large-diameter portion 5. The diameter of the portion 5 is made equal to the outer diameter of the outer rings of the two bearings.

A metal ring 6 with a thin wall is fitted on the portion 5. A metal ring 6', which is identical in configuration with the metal ring 6, is fitted on the outer ring of the bearing 7. Then the subassembly comprising the metal ring 6' and bearing 7 is fitted on the portion 4.

Figure 3:
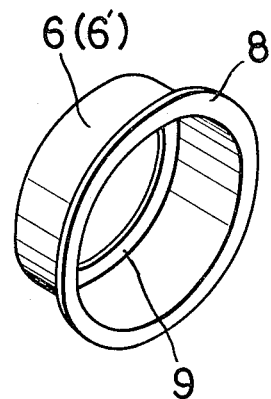
FIG. 3 is a perspective view of a metal ring used in the present invention.

Referring now to FIG. 3, an outward eccentric flange 8 is provided on one end of the metal rings 6 and 6', and an inward flange 9 is provided on the other end thereof. The metal rings 6 and 6' are formed by pressing so that the inside diameter thereof is made equal to the outer diameter of the outer ring of the bearing 7.

The metal ring 6 is fitted on the portion 5 with the outward flange 8 disposed close to the base of the male mold 1 and the inward flange 9 abutting the shoulder 5' of the portion 5. The bearing 7, on the outer ring of which the metal ring 6' is fitted, is fitted on the portion 4 until the inward flange 9 of the metal ring 6' engages the shoulder 3' of the core 3.

After the metal ring 6 and the bearing 7 with the metal ring 6' have been fitted on the portions 5 and 4, respectively, in the above-described manner, the female mold 2 is fitted on the male mold 1. Then a cavity 10, which is adapted to give the form of a housing 11, is formed between the male mold 1 and the female mold 2 as shown in FIG. 1. Fluid synthetic resin is injected into the cavity 10 under pressure, and the body of the housing 11 is molded with the outward flanges 8 of the metal rings 6 and 6' embedded therein.

Figure 2:
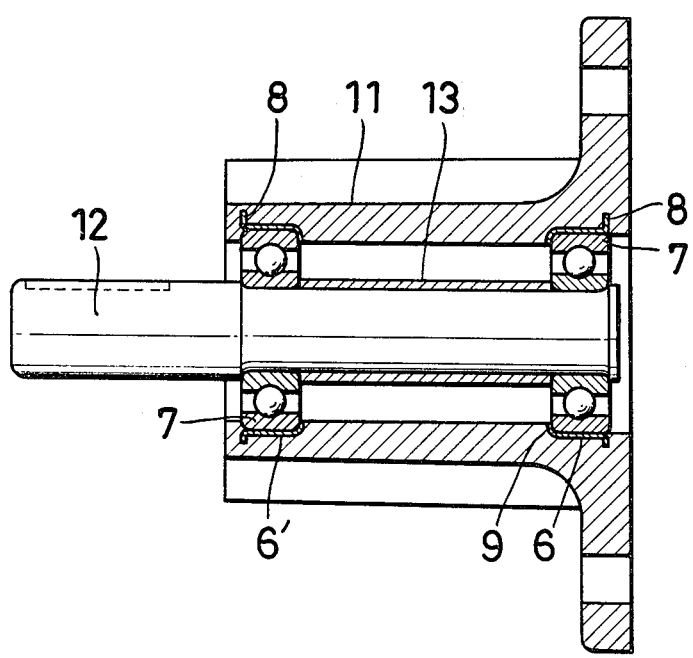
FIG. 2 is a vertical section of a bearing housing molded by the method according to the present invention.

When the housing 11 has cooled and cured, it is taken out of the molds 1 and 2. A shaft 12 with a key way is inserted from the left in FIG. 2 into the bearing 7. A sleeve 13 for holding the inner rings of the two bearings 7 at a distance from each other is fitted on the shaft 12. Then the second bearing 7 is inserted into the socket formed between the shaft and the metal ring 6.

The shaft 12 can be prevented from slipping out of the bearings 7 in various ways. For example, the end of the shaft 12 projecting from the second bearing 7 may be caulked. In the alternative, an end plate may be secured to the end of the shaft.

The housing 11 manufactured by the method of the present invention is free from the disadvantage incidental to a conventional housing of synthetic resin. Such a housing has a disadvantage that the heat generated in the bearing when the shaft rotates causes the housing to expand to a greater degree than the bearing because of the difference in the coefficient of expansion. This makes the inside diameter of the housing larger than the outside diameter of the bearing with a tubular space left between the housing and the bearing, and thereby makes the support of the shaft unstable.

The shaft 12 supported by the bearing housing 11 manufactured by the method of the present invention is less susceptible to becoming unstable, because the metal rings 6 and 6' are interposed between the bearings 7 and the housing 11 and because the coefficient of expansion of the metal rings 6 and 6' is nearly equal to that of the bearings 7.

The small-diameter portion 4, instead of being formed on the end of the core 3 as in the embodiment, may be formed on the female mold 2.

Thanks to the above-mentioned arrangement, the metal rings 6 and 6' have their axes accurately coaxial with the axis of the core 3 and consequently the axis of one metal ring can be made to accurately coaxial with that of the other metal ring.

Another advantage is that under the pressure of the fluid synthetic resin injected into the cavity 10, the thin walls of the metal rings 6 and 6' can be deformed so as to come in close contact either with the portion 5 or with the bearing 7. As a consequence, the axis of the second bearing 7, which is inserted into the socket formed by the metal ring 6, can be made to be accurately coaxial with the axis of the first bearing 7.

According to the method of the present invention, all that has to be done after the molding of the housing 11 is to press the shaft 12 into the first bearing 7, mount the second bearing 7 on the shaft into the socket formed by the metal ring 6, mount the sleeve 13 on the shaft, and take a necessary step to prevent the shaft 12 from slipping out of the bearings 7. This provides a simple and efficient method of manufacturing a bearing housing with two bearings.

While a preferred embodiment of the present invention has been disclosed, it is to be understood that it has been described by way of example only, various other modifications being obvious.

What I claim is:

1. A method of manufacturing a bearing housing coaxially accommodating two bearings, comprising the steps of fitting a metal ring on a large-diameter portion of a core of a male mold, fitting another metal ring on the outer ring of a bearing, fitting said bearing and said another ring on a small-diameter portion of said core, axially aligned with and spaced from said first mentioned ring, fitting a female mold on said male mold with a cavity left between said female mold and said male mold, injecting fluid synthetic resin into said cavity, cooling and curing said fluid synthetic resin so as to form a housing, taking said housing out of said molds, pressing a shaft into said bearing, fitting a sleeve on said shaft between said metal rings, and inserting another bearing into a socket formed by said first mentioned metal ring on the large-diameter portion.

2. The method as set forth in claim 1, wherein each of said metal rings is provided with an outward eccentric flange.

3. A method of manufacturing a bearing housing coaxially accommodating two bearings, comprising the steps of fitting a metal ring on a large-diameter portion of a core of a male mold, fitting another metal ring on the outer ring of a bearing, fitting said bearing and said another ring on a small diameter portion of a core of a female mold, axially aligned with and spaced from said first mentioned ring, fitting said female mold on said male mold with a cavity left between said female mold and said male mold, injecting fluid synthetic resin into said cavity, cooling and curing said fluid synthetic resin so as to form a housing, taking said housing out of said molds, pressing a shaft into said bearing, fitting a sleeve on said shaft between said metal rings, and inserting another bearing into a socket formed by said first mentioned metal ring on the large-diameter portion.

4. The method as set forth in claim 3, wherein each of said metal rings is provided with an outward eccentric flange.

* * * * *